Aug. 20, 1946.  W. B. ELLWOOD ET AL  2,406,008
JIG
Filed Nov. 29, 1941   5 Sheets-Sheet 1

INVENTORS: W. B. ELLWOOD
H. E. HILL
BY
ATTORNEY

Aug. 20, 1946.  W. B. ELLWOOD ET AL  2,406,008
JIG
Filed Nov. 29, 1941  5 Sheets-Sheet 2
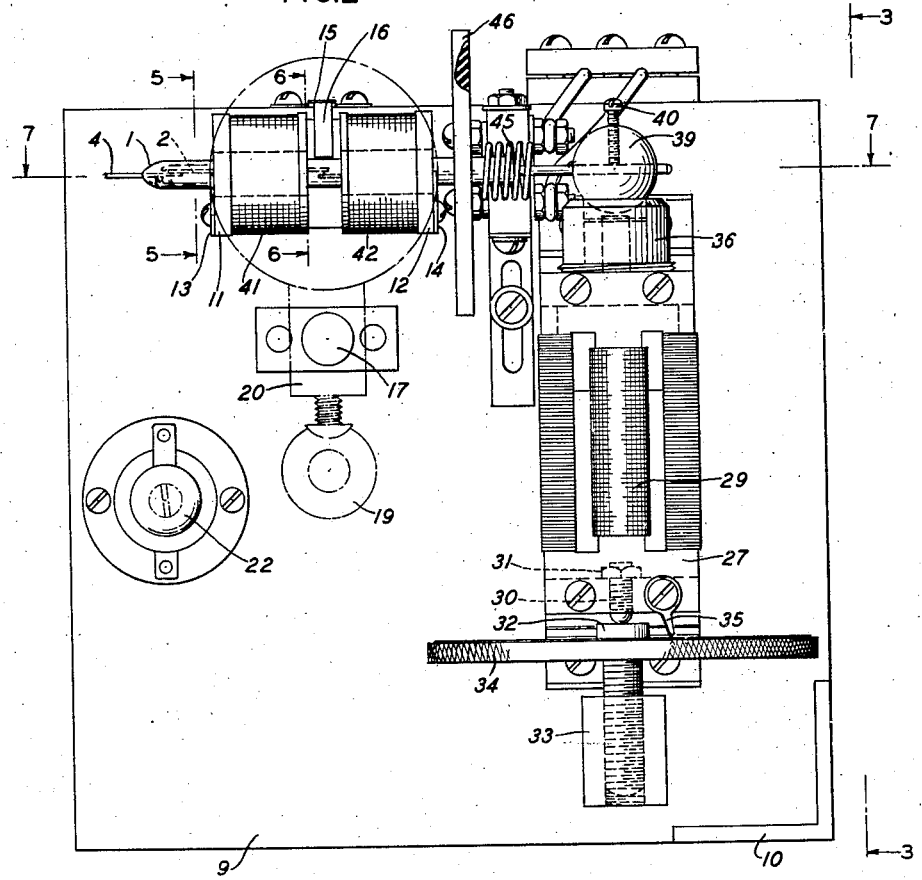
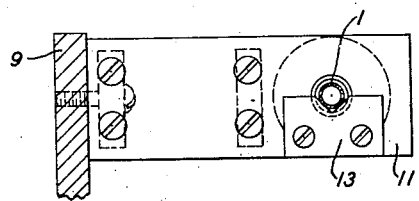
INVENTORS: W. B. ELLWOOD
H. E. HILL
BY
ATTORNEY Aug. 20, 1946.  W. B. ELLWOOD ET AL  2,406,008
JIG
Filed Nov. 29, 1941   5 Sheets-Sheet 3

INVENTORS: W. B. ELLWOOD
H. E. HILL
BY
ATTORNEY

Aug. 20, 1946.  W. B. ELLWOOD ET AL  2,406,008
JIG
Filed Nov. 29, 1941  5 Sheets-Sheet 4
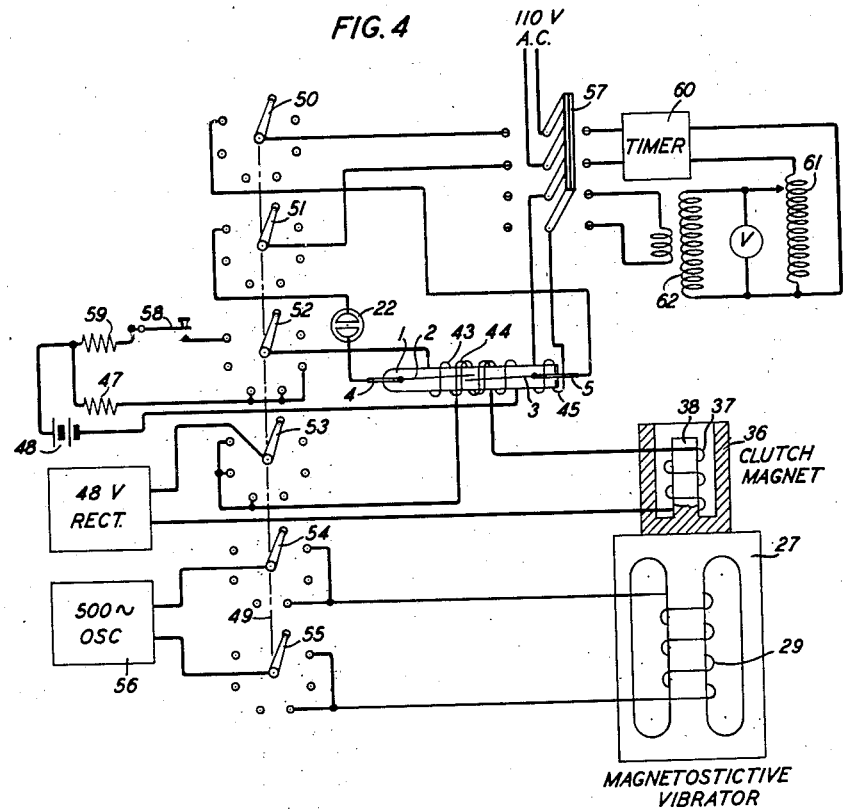
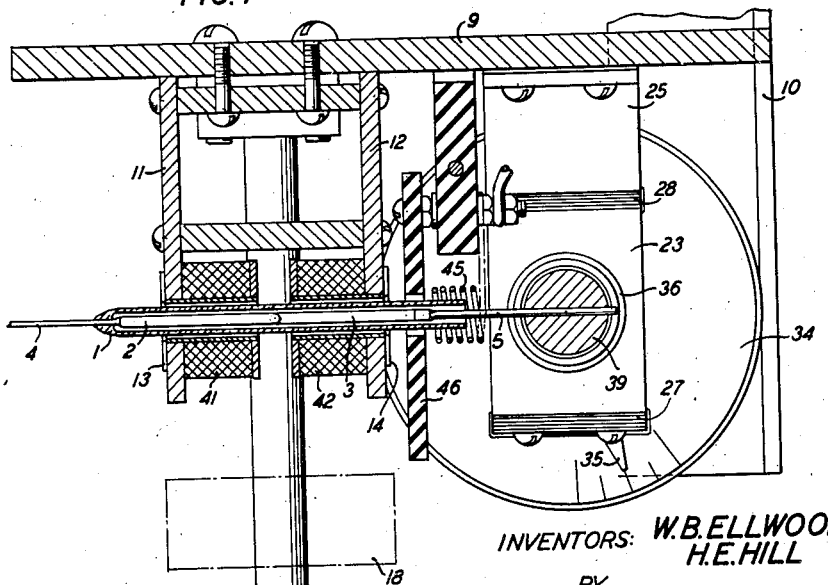
INVENTORS: W. B. ELLWOOD
H. E. HILL
ATTORNEY Aug. 20, 1946.  W. B. ELLWOOD ET AL  2,406,008
JIG
Filed Nov. 29, 1941   5 Sheets-Sheet 5

INVENTORS: W. B. ELLWOOD
H. E. HILL
BY John A. Hall
ATTORNEY

Patented Aug. 20, 1946

2,406,008

UNITED STATES PATENT OFFICE 2,406,008

JIG

Walter B. Ellwood, New York, N. Y., and Henry E. Hill, El Paso, Tex., assignors to Bell Telephone Laboratories, Incorporated, New York, N. Y., a corporation of New York Application November 29, 1941, Serial No. 421,084

10 Claims. (Cl. 200—87)

This invention relates to electromagnetically operated switches and particularly the sealed reed type of switch in which the magnetically movable members also act as the contact device. Switches of this kind consist generally of a tiny glass tube with the magnetic contact reeds sealed in at the ends of the tube and immersed either in an inert gas or a vacuum. These contact units are then inserted into solenoids so that the airgap of the completely relay comes substantially at the point in the center of the coil where the greatest efficiency is obtained.

The object of the invention is to provide a method of manufacture whereby contact units of great uniformity may be produced economically. Due to the small size of the contact units, the extremely small movement of the reeds and the fact that no adjustments can be made after the reeds have been sealed into the tubes great accuracy and skill must be exercised in producing such units. But since experience has shown that a method of manufacture which depends on the skill of the operator alone is generally unsound from an economical standpoint the object of the present invention is to provide a method which substitutes a novel operation for one which would otherwise require great skill and delicacy of handling.

In accordance with this object a jig is provided having a mechanical device for moving a reed into position by vibration and then a magnetic means for clamping the positionally adjusted reed firmly into such position while the sealing-in process is being carried out.

In the process of manufacture a proper-sized glass tube is clamped into position in the jig and a reed properly welded to a lead-in wire is placed in position and observed by a calibrated optical system. When the reed is in position it is clamped magnetically and the end of the glass tube is then heated to produce a seal between the end of the glass tube and the lead-in wire. Thereafter, the glass tube with one reed sealed in is reversed in its clamp and the second reed inserted. The two reeds are then magnetized to hold their contact surfaces together and this second reed is then vibrated gently to bring it in exact alignment with the first reed. While this operation might be performed by hand, it can be more quickly and accurately performed by this mechanical method. After various adjustments are made which may be observed by the optical system provided the second reed is firmly clamped in position and is then sealed in. The clamp for this purpose consists of a ball and socket joint which allows the second reed to be moved freely in several directions and which when magnetized holds the second reed firmly in its final position without strain during the sealing-in operation.

A feature of the invention is a clamp to which a reed may be secured after it is adjusted to a predetermined overlap of the reeds which will prevent further longitudinal movement of the reed but will allow free movement thereof in any other direction. By this means the reed is adjusted as to length but thereafter virtually secured at a single point so that it may be rotated to bring the plane surfaces of the reed into exactly parallel planes. The reed may be moved from side to side and up and down so that other adjustments may be made. When the two reeds are thus adjusted so that their overlapping ends are in contact with each other over the entire overlapping surfaces, the single point clamp is secured so that no further movement of the reed can take place in regard to the clamp. Thereafter the clamp is moved by simple translation along a line parallel to a line normal to the overlapping contact surfaces of the reed until the required separation of the reeds has been attained whereupon the reed is sealed in.

Another feature of the invention is the criterion used in fixing the position of the second reed before sealing. While from a mechanical standpoint it might be desirable to separate the reeds by an invariable predetermined amount the operating characteristics of the finished unit are more important and hence the separation is varied until a desirable operating characteristic has been reached. Since this depends on overlap of the reeds, their magnetic properties and their mechanical properties the separation of the reeds is varied to achieve uniformity in such other characteristic. Accordingly, a monitoring feature is employed whereby the reeds are operated repeatedly under conditions which will be met in later actual service. The operating current is set at the desired "just-operate" value of the relay and the second reed is then moved by simple translation until the relay does just operate, after which the seal is made.

A feature of the invention is a magnetic ball and socket joint which unmagnetized allows a free movement of the reed and when magnetized secures the reed without strain.

Another feature of the invention is a vibrating link between the frame of the jig and the ball and socket clamping device by means of which the reed being positioned may be moved into its final position without strain.

A further feature of the invention is a means for moving the jig into a position where the glass tube and the secured reed are in a vertical position so that when the glass of the tube is softened during the sealing-in process it will flow in a direction which will set up no strains upon cooling.

Other features will appear in the following description.

The drawings consist of five sheets having thirteen figures as follows:

Fig. 2 is a front view of the jig with certain parts not shown whereby the construction of other parts may be more clearly explained;

Fig. 4 is a circuit diagram of the electrical connections of the jig whereby the method of operation may be explained;

Fig. 5 is a fragmentary end view of the jig taken along the broken line 5, 5 of Fig. 2;

Fig. 6 is another fragmentary end view of the jig taken along the broken line 6, 6 of Fig. 2;

Fig. 7 is a top view of the jig partly in section and taken along the broken line 7, 7 of Fig. 2;

Figure 13:
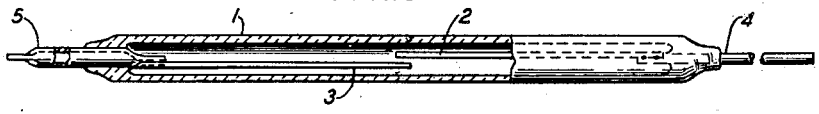
Fig. 13 shows, partly in cross section, a completed relay contact unit.

The jig, forming the subject-matter of the present invention, is employed in the manufacture of the sealed contact device known as the Ellwood unit. Referring to Fig. 13 where this device is shown it will be seen to consist of a glass tube 1 in which two reeds 2 and 3 of magnetic material are placed. The magnetic reed 2 is welded to a lead-in wire 4, also of magnetic material which having excellent properties for the purpose of making a seal to glass is used at the point where the glass tube 1 is heated to form the seal. It should be noted that the lead-in wire 4 need not necessarily be of magnetic material but may be of any electrical conducting material which will produce a good and lasting seal to glass or whatever other material may be used for the tube 1. The reed 3 is welded to a metal tube 5 of the same material as the wire 4 and is used for making the seal at the other end of the tube. The reeds 2 and 3 having their ends overlapping by a small amount are spaced a given distance apart. When in service this unit is brought into a magnetic field the two reeds come together and establish an electrical contact. The tube 5 is used for pumping out the air and admitting the inert gas used and is then crushed to form an air-tight seal. The wire 4 and the tube 5 are used as electrical terminals of the device.

Figure 11:
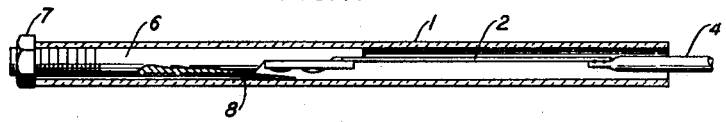
Fig. 11 is another detailed view showing how the jig of Fig. 10 is placed in a glass tube.
Figure 12:
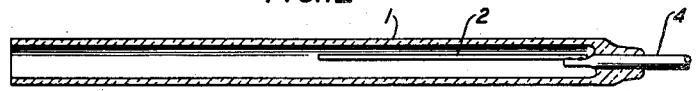
Fig. 12 shows a reed sealed in a glass tube and the jig of Fig. 10 removed.

In manufacturing this device the first step is to fit the end of a reed 2 which has already been welded to its wire 4 in the end of a jig consisting of a rod 6 having an outside diameter only slightly smaller than the inside diameter of the tube 1. The other end of the rod 6 is threaded to receive the nut 7 by which the position of the reed 2 in the tube 1 can be accurately adjusted. A spring 8 attached to the rod 6 will hold the rod firmly in the tube 1. When the reed holding jig is placed in the tube 1 as shown in Fig. 11, the opposite end of the tube 1 is heated so as to form the seal. Fig. 12 shows the seal after having been formed and the reed holding jig withdrawn. Preferably the assembly shown in Fig. 11 is placed in a vertical position and the lower end heated until the glass softens and adheres to the wire 4 as shown in Fig. 12. Preferably also the heating is done by placing this lower end within a coil of wire through which an appropriate current of electricity is passed for a given time.

The principal use of the jig forming the subject-matter of this invention is to start with the Ellwood unit as shown in Fig. 12 and make them into the form shown in Fig. 13.

Figure 1:
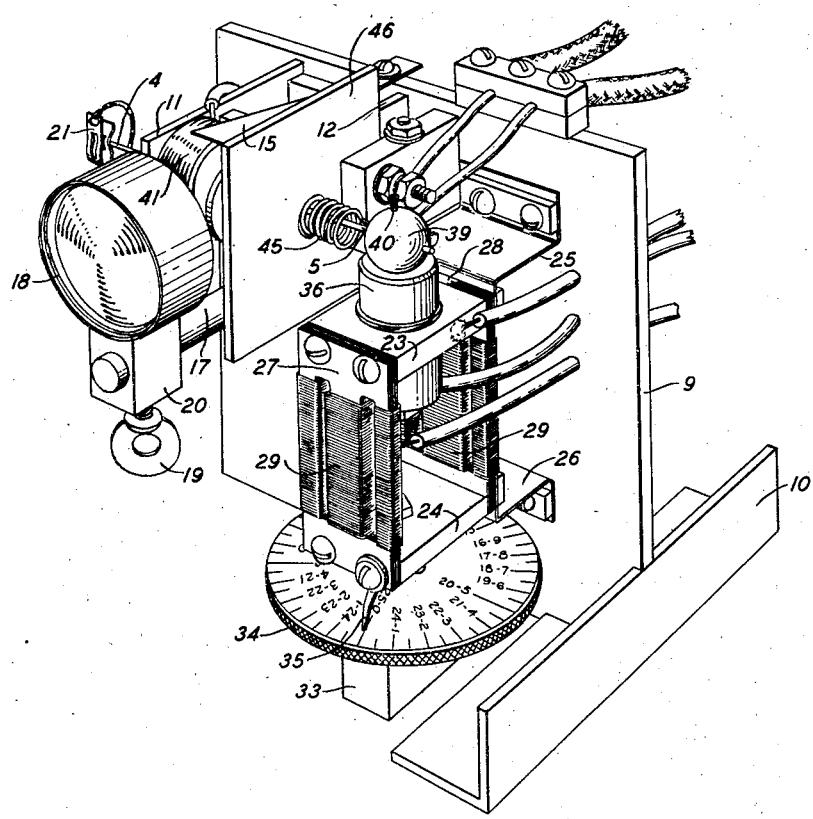
Fig. 1 is a perspective view of the jig embodying the present invention.
Figure 3:
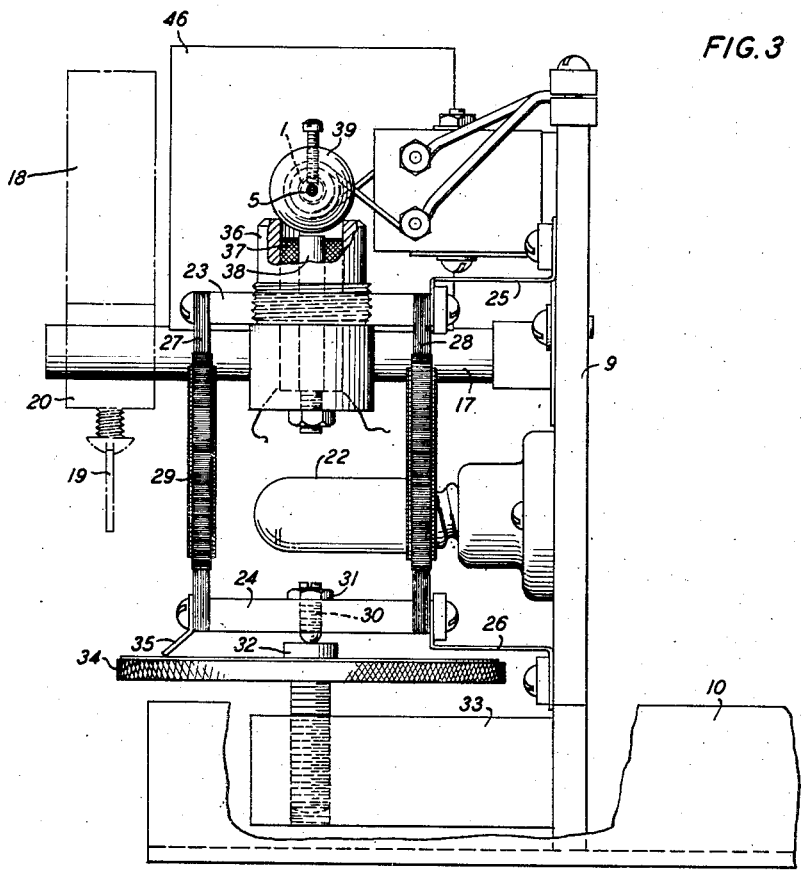
Fig. 3 is an end view of the jig taken from the viewpoint indicated by the broken line 3, 3 in Fig. 2.

The jig consists of a frame member in the form of a plate 9 secured to an angle member 10. This frame will rest on a flat level surface in the position shown in Fig. 1 or it may be rotated in a clockwise direction a distance of ninety degrees for placing the tube in a vertical position during the sealing-in operation. All the apparatus of the jig is secured to the plate 9.

By means of two brackets 11 and 12 having elements 13 and 14 provided with V-shaped jaws and a spring 15 provided with a finger 16, a tube 1 can be rigidly and accurately clamped in the jig. A rod 17 rigidly secured to the plate 9 is used as a mounting for a calibrated optical device 18 through which the tube 1 and the end of the reed 2 may be viewed and a longitudinal adjustment of the tube 1 may be made so that the end of the reed 2 is brought to the position indicated in Figs. 2 and 7. The optical device 18 may be adjusted for focus by loosening the thumb screw 19 so as to slide the block 20 along the rod 17. When the assembly of Fig. 12 is properly clamped in the jig as described, an electrical connection is made to the wire 4 by means of a clip 21 so that the reed 2 is connected to the cold cathode neon tube 22 for testing purposes hereinafter described.

Figure 8:
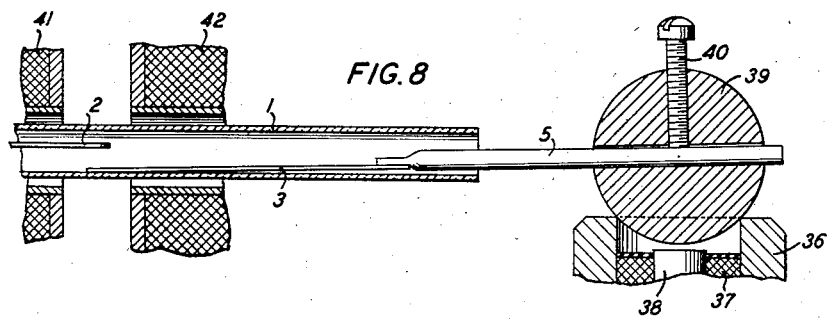
Fig. 8 is an enlarged fragmentary view in section to explain one step in the operation of the jig.
Figure 9:
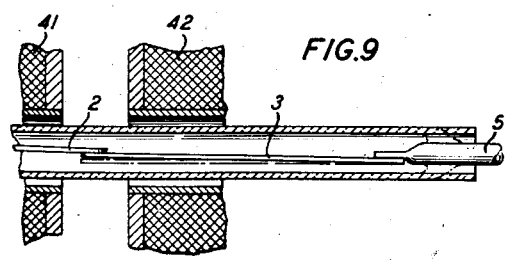
Fig. 9 is another enlarged fragmentary view in section to explain another step in the operation of the jig.
Figure 10:
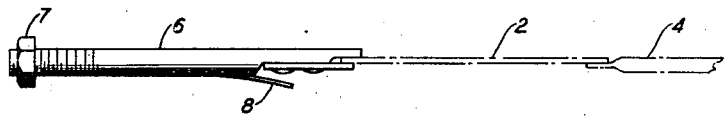
Fig. 10 is a detailed view showing a jig for accurately holding a reed in a tube during the sealing-in process in preparation of the tube for operations to follow by the use of the jig of Figs. 1, 2, 3 and 7.

A support for holding the reed 3 and the tube 5 consists of a pair of plates 23 and 24 secured to the frame member 9 by leaf springs 25 and 26 respectively. These springs are tensioned to give a downward thrust to the support sufficient to produce the greatest expected downward movement. The two plates 23 and 24 are secured together by the slotted laminated magnetic material elements 27 and 28, about which a coil 29 is wound. The laminated elements 27 and 28 act as magnetostriction elements so that when the coil 29 is connected to a source of alternating current, of 500 cycles by way of example, the plate 23 will be gently vibrated. It is common knowledge that magnetic material when magnetized undergoes slight mechanical deformation so that the slotted laminated elements 27 and 28 when energized by the 500-cycle alternating current will cause the upper plate 23 to be vibrated, the spring 25 allowing a vertical vibratory movement thereof. The support as a whole is held from moving downward under the influence of the springs 25 and 26 by a set screw 30 coming to rest on the rod 32. This latter rod 32 is provided with a fine thread working into a block 33 secured to the frame plate 9 so as to form a micrometer adjustment of the support. The rod 32 is provided with a large flat dial 34 which has appropriate markings on its upper face to be observed in relation to a pointer 35. Rotation of the dial 34 will result in a movement of simple translation of the shell 36 and the ball 39 and, therefore, of the reed 3 (Figs. 8 and 9).

To the top plate 23 there is secured a cylindrical shell 36 of magnetic material inside of which there is a coil 37 wound about a core 38. A ball 39 of magnetic material may be rigidly clamped in any position to which it has been adjusted by energizing the coil 37.

The ball 39 is pierced by a hole passing directly through its center of a size to accommodate the tube 5. With the ball 39 resting on the inner edge of the cylinder 36 a tube 5 with the reed 3 welded thereto is placed therein and after being adjusted longitudinally for proper length is clamped in the ball 39 by the set screw 40. After other adjustments have been made the coil 37 is energized to rigidly clamp the ball 39 and then the reed 3 so clamped is moved away from the reed 2 by simple translation through the movement of dial 34.

The tube I passes through the center of a pair of coils 41 and 42 which provide a pair of windings 43 and 44 (Fig. 4). The open end of the tube I is also positioned to be surrounded by a heavy coil 45 used to heat the glass to form the seal to the tube 5. A shield 46 of asbestos or other heat insulation is placed between the coil 45 and the coil 42 for protection during the sealing-in operation.

The manner of use of the jig may be understood with the help of the circuit diagram of Fig. 4. The broken line 49 represents a shaft for a gang switch having wipers 50 to 55, inclusive. After the assembly of Fig. 12 is properly clamped in the jig and the longitudinal adjustment of the tube 5 in the ball 39 is made, the gang switch is turned one step in a clockwise direction. In this position the magnetostriction vibrator is operated until through observation through the optical device 18 the ends of the reeds 2 and 3 appear to be in perfect contact. If the reeds touch each other at an angle so that only the tip of one touches the other then the dial 34 is rotated until a perfect plane to plane contact is made.

Thereafter the gang switch is moved another step whereupon a circuit through coil 43 and resistance 47 is established including a source of current 48 of sufficient strength to hold the reeds firmly together. Next the gang switch is moved another step whereupon the magnetostriction vibrator is again energized by the source of alternating current 56 while the reeds are still held firmly together. The next step of the gang switch opens the circuit of coil 29 and closes a circuit for the coil 37 so that the ball 34 is now firmly clamped in position. This circuit also includes the coil 44. Upon the next step of the gang switch, the circuit through coil 43 is opened and in this position with the bias provided by coil 44 the dial 34 is moved until the proper separation of the reeds has been attained. Upon the last step of the gang switch and with the switch 57 thrown to the left the proper establishment of contact between the reeds may be observed by the response of the neon tube 22. The contacts may be made to open and close by operating the button 58 which energizes the coil 43 through the resistance 59. By this resistance the proper operating current to produce a "just-operate" condition in service is obtained. The separation of the reeds is then varied by turning the dial 34 while repeatedly operating the button 58 until the relay does just operate. By this monitoring operation great uniformity in operating characteristics of the finished product is obtained. All adjustments appearing satisfactory the jig is rotated in a clockwise position where the tube will be in a vertical position. The switch 57 is then thrown to the right and the timer 60 operated. By previous adjustment of the autotransformer 61 and through the step-down transformer 62 a heating current is passed through the coil 45 for a predetermined time. This is sufficient to melt the end of the glass tube I to form a seal to the tube 5. As soon as the seal has sufficiently cooled the gang switch is moved to its normal position as shown, the completed assembly as shown in Fig. 13 is removed and the operation repeated to form another contact unit.

What is claimed is:

1. The method of manufacturing sealed tubes having magnetically movable elements therein which consists of securing a tube with one element sealed therein, inserting a second element secured to a clamp allowing a plurality of movements into said tube, mechanically adjusting said clamp until said element has been aligned with said first element without strain, securing said clamp, and sealing in said second element.

2. The method of manufacturing sealed tubes having magnetically movable elements therein which consists of securing a tube with one element sealed therein, inserting a second element secured to a clamp allowing a plurality of movements into said tube, mechanically vibrating said clamp until said element has been aligned with said first reed without strain, moving said second element from said first element by simple translation of said clamp and sealing in said second element.

3. The method of manufacturing sealed tubes having magnetically movable elements therein which consists of securing a tube with one element sealed therein, inserting a second element into said tube a distance to gain a predetermined overlap between the ends of said elements, securing said second element at a single point to fix said overlap and allow free movement in every other direction, vibrating said point to align said second element into position with said first element, clamping said second element into such position at said point, moving said elements apart by simple translation of said point in a line parallel to a line normal to the contacting surfaces of said elements and sealing in said second element.

4. The method of manufacturing sealed tubes having magnetically movable elements therein which consists of securing a tube with one element secured therein, inserting a second element into said tube to a predetermined overlap between the ends of said elements, securing said second element at a single point against further longitudinal movement thereof, vibrating said point to align said elements until their overlapping surfaces are in contact throughout such overlapping surfaces, securing said point against further movement of said element about such point, moving said point by simple translation along a line parallel to a line normal to such contact surfaces, rotating the jig to which said tube and said second element are firmly secured to a vertical position of said tube and heating the end of said tube to seal in said second element.

5. A jig for manufacturing sealed tubes having magnetically movable elements therein, comprising a clamp for securing a tube with a first element sealed therein, a clamp for holding a second element against longitudinal movement thereof, a means for mechanically vibrating said clamp for moving said elements into alignment, a means for securing said clamp against further movement of said second element, and means for sealing in said second element.

6. A jig for manufacturing seal tubes having magnetically movable elements therein, comprising a clamp for securing a tube having a first element sealed therein, a second clamp having mechanical means for securing a second reed against longitudinal movement and magnetic means for securing said second element against movement in other directions, magnetic means for vibrating said second clamp to move said second element into alignment with said first element, a micrometer adjustment for translating said second element in a line parallel to a line normal to the contacting surfaces of said adjusted elements and means for sealing in said second element.

7. A jig for manufacturing sealed tubes having magnetically movable elements therein, comprising a clamp for securing a tube having a first element sealed therein, a second clamp having mechanical means for securing a second reed against longitudinal movement and magnetic means for securing said second element against movement in other directions, a mounting for said second clamp including a magnetostriction element for vibrating said second clamp to move said second element into alignment with said first element and a micrometer adjustment for translating said second element in a line parallel to a line normal to the contacting surfaces of said adjusted elements and means for sealing in said second element.

8. A jig for manufacturing sealed tubes having magnetically movable elements therein, comprising a clamp for securing a tube having a first element sealed therein, a second clamp having mechanical means for securing a second reed against longitudinal movement and magnetic means for securing said second element against movement in other directions, a mounting for said second clamp including a magnetostriction element for vibrating said second clamp to move said second element into alignment with said first element and a micrometer adjustment for translating said second element in a line parallel to a line normal to the contacting surfaces of said adjusted elements, an optical system for observing the state of alignment existing between said elements during the process of alignment, and means for sealing in said second element.

9. A jig for manufacturing sealed tubes having magnetically movable elements therein, comprising a clamp for securing a tube having a first element sealed therein, a second clamp having mechanical means for securing a second reed against longitudinal movement and magnetic means for securing said second element against movement in other directions, a mounting for said second clamp including a magnetostriction element for vibrating said second clamp to move said second element into alignment with said first element and a micrometer adjustment for translating said second element in a line parallel to a line normal to the contacting surfaces of said adjusted elements, an electrical signal system for observing the state of alignment existing between said elements during the process of alignment, and means for sealing in said second element.

10. A jig for manufacturing sealed tubes having magnetically movable elements therein, comprising a clamp for securing a tube having a first element sealed therein, a second clamp for securing a second element during the sealing-in process applied to a second element, said second clamp comprising a magnetic ball and socket joint, said ball having an aperture therein and means for securing a second element against longitudinal movement and magnetic means for securing said ball in said socket against movement in other directions, means for vibrating said ball and socket joint before said joint is magnetized to align said elements and means for moving said ball and socket joint after magnetization in simple translation in a line parallel to a line normal to the contact surfaces of said aligned elements.

WALTER B. ELLWOOD.
HENRY E. HILL.